Patented Aug. 14, 1945

2,382,568

UNITED STATES PATENT OFFICE 2,382,568

MANUFACTURE OF MOLDED PRODUCTS FROM VEGETABLE STARTING MATERIAL

Ali Karim, Calcutta, British India

No Drawing. Application March 17, 1943, Serial No. 479,491. In British India March 20, 1942

13 Claims. (Cl. 18—47.5)

This invention relates to the manufacture of molded products and more particularly to the manufacture of molded products employing a new plastic molding material of vegetable origin.

By the term "plastic molding material" is meant herein a material which is capable of being given a determined shape or form which it will retain when hardened. Such shape or form may be imparted to it, for example, in a mold or frame with the application of pressure or suction, or both, and by drying it with or without the application of heat or merely with air drying.

Plastic molding materials have generally been prepared from synthetic or natural resinous materials, with or without fillers, and with the help of heat or pressure, or both, taking advantage of the heat-hardening or polymerizing properties of the resinous materials employed. Owing, however, to the expense of the raw materials required for the production of synthetic resins, and to the limited supply of natural resins available, the cost of manufacturing molded products from plastic resinous materials is relatively high.

It has also been proposed to produce from cocoanuts and like vegetable matter a pulp which is first dried before it is mixed with well known binding materials such as sulphur, India rubber, shellac or the like, and is then dissolved in a suitable solvent whereby to produce a plastic molding material. Such a proposal, however, approaches closely to that of the resinous materials previously referred to since it is essentially the binding material used (which is generally of a resinous nature) which imparts to the composition its plastic properties.

It has still further been proposed to produce from vegetable matter, such as straw, a binding material which can be used for binding coal or the like into briquettes. The molded products made, however, namely the briquettes, are essentially composed of the coal or the like and the vegetable binder merely serves to cause the coal particles to adhere together. The vegetable binder is not itself of a nature (nor is it contemplated that it should be such) that it can itself and by itself be molded into and provide molded products of industrial or commercial utility.

The present invention has for its main object to provide a process for the manufacture of molded products employing a plastic molding material of vegetable origin, which process is not only simple and economical to practice, but results in a molded product having the necessary firmness, strength and toughness to be applicable to a wide number of uses, including most (if not all) of those to which the hitherto made heat-polymerized resinous molded products have been applied, and to which a desired finish and appearance may readily be given.

It has for another object to provide a process for the manufacture of a plastic molding material from which the said molded products aimed at in the immediately preceding paragraph may be made, which process employs as starting material a material which is readily available commercially and may be simply and economically processed to produce a plastic molding material of essentially vegetable origin which does not require the addition thereto of any binding media, whether resinous or otherwise, in order to be molded into the desired shape and form of product to be made.

It has for a further object to employ as the said starting material a vegetable material or materials which is or are readily available in large quantities and in respect of which attempts have been made in vain in the past to find an economical and profitable use.

The vegetable plant material known as water-hyacinth (*Eichhornia crassipes*, Solms, belonging to the family *Pontederiaceae*) has developed to an extent such that it frequently is considered a weed and pest, blocking up rivers, canals, ponds, tanks, arable lands etc. Its growth is rapid and luxuriant and although investigations have been undertaken over a number of years to eradicate or minimize its growth, or to find some economic use for the same, such investigations have not hitherto been wholly successful.

The present invention aims at converting it into a commercial commodity which may be applied to the production of molded products having a wide variety of uses.

According to the invention, a process for the manufacture of molded products comprises employing, as starting material, the vegetable plant material known by the name of water-hyacinth (or by the scientific terms hereinbefore given), subjecting the said material to digestion by boiling in an aqueous digesting medium, i. e. water or a chemical digesting liquor, in order to convert the same to the state of a moisture-containing soft pulp still retaining nitrogenous or inorganic matters or both nitrogenous and inorganic matters, and which is thereby characterised by having natural binding properties and being itself moldable into the desired shape and form of product to be made, molding the product from the said pulp while the latter is in the wet state and without the use of additional binding media, preferably employing pressure or suction, or both, with or without heat, and drying the molded product.

By its treatment of the water-hyacinth material to produce a moisture-containing soft pulp which is itself usable as a plastic molding material without the use of additional binding media, the invention is believed to be the first to provide for the production from such a starting material of commercially and industrially useful molded products of the character hereinafter defined.

The digestion of the water-hyacinth material being effected by boiling, with or without chemical reagents, it thereby tends to a chemical digestion of the material similar to that which has been practised in the production of other kinds of pulps, but the pulp obtained is used essentially while still in the moisture-containing condition with the fibres swollen with water and while still containing the nitrogenous, inorganic ligno-cellulosic matters, or a combination of the nitrogenous, inorganic and ligno-cellulosic matters. In addition, therefore, to being directed to the production of a pulp for the molding of quite different products (such as boards and shaped articles following examples which will hereinafter be given), the invention comprises the production of a vegetable pulp starting from quite different vegetable material and having quite different properties to the pulps which have previously been proposed for the manufacture of paper and the like. The invention is therefore to be considered as definitely excluding from its scope and from the scope of the term "molded products" where used hereinafter and in the appended claims, the manufacture of paper pulp as may have been practised heretofore.

As in the production of other pulps, the boiling or chemical digestion of the water-hyacinth pulp in accordance with the invention may, if desired, be supplemented (either previously or simultaneously) by a mechanical action on the water-hyacinth material which prepares the same for the boiling or chemical digestion and/or which partially mechanically digests the material before the boiling or chemical digestion takes place, or both partially mechanically digests the material and prepares the same for the boiling or chemical digestion. The chemical digestion is preferably effected by means of an alkaline digesting liquor, although it is possible that acid or neutral reagents may also or alternatively be employed.

In the practice of the process, the invention further comprises, as an important feature thereof, the step of converting the water-hyacinth material by digestion into a moisture-containing pulp of the character hereinbefore defined and then allowing the same to "ferment" (which term includes herein and in the appended claims natural rotting or decaying) until the pulp has become slimy and capable of holding a large quantity of water intimately admixed therewith, before further employing the same. It is only after such fermentation has taken place that the fermented water-containing pulp may be applied to the production of the desired molded products. It has been found that the fermentation imparts to the pulp an unexpected binding property which considerably enhances the strength and toughness of the molded product.

In carrying this feature of the invention into practice, the water-hyacinth plant material is preferably subjected to chemical digestion by boiling in water, with or without the addition of alkali, until the vegetable material is reduced to a soft pulp. The pulp is then washed free from dirt and alkalinity and stored to allow fermentation to take place. The plastic water-containing fermented pulp is then ready to be molded into the desired shape and form of product to be made.

As will be explained more fully hereinafter, it is believed that it is the presence of nitrogenous and inorganic matters in the water-hyacinth pulp which imparts to the latter the natural binding property by means of which the invention provides for the said pulp to be molded directly into the desired shape and form of product to be made. The invention is not, however, restricted to the molding of the water-hyacinth pulp by itself and, according to a feature of the invention, it may, if desired, be mixed with one or more other vegetable pulp materials obtained from other and quite different starting materials, for the purpose of molding. One such other vegetable pulp material with which the water-hyacinth pulp of the invention may advantageously be mixed is pulp made from jute-stalk.

Jute-stalk is a soft woody material constituting the greater part of the jute plant which is left after the jute fibres have been removed by the process of retting. Hitherto, this stalk (which is available in very large quantities as a by-product of the jute industry in India) has been used only as a sort of inexpensive fuel, and for fencing, and therefore has given practically no economic return to the jute grower. The present invention also aims at converting this jute-stalk into a pulp which can be admixed with the water-hyacinth pulp previously described and used therewith as a plastic molding material for the production of the desired molded products.

As in the case of the water-hyacinth pulp, the pulping of the jute-stalk material is effected by boiling or chemical digestion supplemented, if desired, either previously or simultaneously, by a mechanical action which prepares the same for the boiling or chemical digestion or which partially mechanically digests the material before the boiling or chemical digestion take place, or which both prepares the material for the boiling as chemical digestion and partially mechanically digests it. The chemical digestion is also preferably effected by means of an alkaline digesting liquor.

In the preferred practice, the jute-stalk is given a preparatory breaking up, or even a crushing, whereafter it is subjected to digestion by boiling in an alkaline digesting liquor of a minimum strength of about 10%. After reduction to the state of a soft pulp, the latter is washed free from alkali and is made (such as by straining or filter-pressing) into a moisture-containing paste or cake which is ready to be admixed with the water-hyacinth pulp and molded into the desired shape of product to be made.

In order to effect this molding, either freshly made jute-stalk pulp is used, or in the case of old stock pulp being used, this is revivified by boiling over again with the digesting liquor before use, as for reasons which will hereinafter be more fully explained it is found that a better molded product is obtained in this way.

Also as will be more fully explained hereinafter, it is believed that it is the main ligno-cellulosic component present in the jute-stalk-pulp which imparts to the latter sufficient natural binding property for it to be used with the water-hyacinth pulp to produce the molded products of the invention.

The molding of the pulp or pulps of the invention is effected such as by placing the pulp or pulp mixture in a selected mold or frame and employing pressure or suction, or both with or without heat, and without the use of additional binding media. As will be described more fully hereinafter, the molded product is found to have hardness and toughness to a surprising degree.

In order that the invention may be more clearly understood, a specific mode of preparation of water-hyacinth pulp in accordance therewith, and of jute-stalk-pulp for optional use in admixture, together with the production therefrom of molded products, will now be described in detail in the following by way of example:

Preparation of moldable pulp from water-hyacinth

A quantity of water-hyacinth plant material, taken either in the green state or in the dried state and with or without the roots of the plant, is boiled in water (with or without the addition of alkali) until the whole of the plant has been reduced to a soft pulp. If desired, this chemical digestion may be assisted by mechanical action on the vegetable material. In the case of alkali being used, this may be from 5% to 10% by weight of the water and the alkaline liquor may be used over again if necessary. The alkali may be sodium or potassium hydroxide or carbonate or lime, or any combination of those alkalies. Alternatively, ash from burnt water-hyacinth may be used.

After the pulping has been completed, the pulp is washed free from dirt and alkalinity and is stored under ordinary atmospheric conditions to allow fermentation to set in. On allowing it to ferment for from 3 to 7 days, the pulp becomes slippery or slimy and capable of holding considerable quantities of water intimately admixed with it. It is extremely difficult to remove this water from the pulp by pressing or the like. It is found that the fermenting process imparts to the pulp an unexpected binding property which makes it possible to mold the pulp into any desired shape or form which it permanently retains on drying, such molding taking place in a manner hereinafter to be described more fully.

It is believed that the unexpected binding (or plastic) properties found in the fermented pulp are due to the presence therein of the nitrogenous and inorganic matters rather than to the presence of the basic cellulosic and organic matters which constitute the major part of the water-hyacinth material. The said inorganic matters constitute about 25% by dry weight of the vegetable material before conversion into pulp and normally include the oxides of potassium, sodium, calcium and phosphorus, some chlorine compounds, and about 1.5% of nitrogen. Generally speaking, it is believed that in the selection of the water-hyacinth starting material for the practice of the invention, said material should contain a minimum of about 1% of nitrogen on the dry weight of the material.

The described fermentation stage is not compulsory as a moldable pulp material may be made without the same. It is still possible to obtain a product of the desired shape and form by molding freshly-made non-fermented pulp, although it is preferred that the pulp should be fermented because the molded product is considerably stronger and harder than the product made with non-fermented pulp.

Preparation of pulp from jute-stalk

Jute-stalk, with or without the roots of the plant and whether in the dry or wet state, is given a preliminary crushing in a crushing or grinding machine so as to pass through a coarse mesh sieve, for example, a 10–25 mesh per square inch. The crushed jute-stalk material is then boiled in water, or preferably in an alkaline liquor of about 10–15% strength until the crushed material is reduced to a soft pulp. The alkaline liquor may be used over again if necessary. The alkali may be sodium or potassium hydroxide or carbonate or lime, as any combination of those alkalis. Alternatively, ash from burnt jute-stalk material may be used.

It is not absolutely necessary that the jute-stalk should be crushed to a state of the fine division before the alkaline digestion. Merely breaking the stems into smaller pieces may be sufficient, but the reduction to a fine state of subdivision has been found to facilitate the pulping operation.

When the pulp has been produced, it is washed free from alkali and is made into a paste or cake by straining, such as through a cloth, or by filter-pressing. It is then ready for molding into the desired form of product, admixed with the water-hyacinth pulp.

The jute-stalk-pulp appears to be composed mostly of ligno-cellulose and, generally speaking, it is believed that in the selection of the jute-stalk material for the practice of the invention, such material should contain a minimum of about 50% ligno-cellulose by dry-weight of the material.

The jute-stalk-pulp is found to have a natural binding property which, when added to the water-hyacinth pulp, assists to impart to the molded product the required strength and toughness. This binding property is, however, considerably impaired if the jute-stalk-pulp is stored in the wet condition for a few days prior to use. It is therefore preferable to use freshly made pulp, or to revivify stored pulp stock by boiling it over again with water or with an alkaline liquor, before molding.

Molding the plastic material

The pulp prepared as described from water-hyacinth may be used alone, or in combination with the jute-stalk pulp (also prepared as described), in order to be molded into the desired product. When used in combination with the jute-stalk-pulp, any desired proportions (for example, equal proportions) may be used depending on the qualities required in the final product. The greater the proportion of water-hyacinth pulp, the more compact and tough will the product be. The difficulty noted previously with regard to the removal of water from the fermented water-hyacinth pulp is appreciably mitigated by admixture of the water-hyacinth pulp with the jute-stalk pulp. In lieu of, or in addition to jute-stalk-pulp, the water-hyacinth pulp may, if desired, be mixed with one or more other pulps made from other materials, such as from straw, grass, shrubs, sawdust and the like, for the purpose of molding.

To produce the desired molded product, the pulp material is placed into a selected mold or frame and pressure is exerted thereon by suitable means, such as by an hydraulic press fitted with steam-heating and water cooling arrangements. The process is a discontinuous one and a molded product of predetermined dimensions is obtained. The molded product may be dried while still under pressure, or subsequently in a drying chamber. Preferably, the drying temperature should not exceed 150° C. If desired, air-drying may be practised.

In the shaping and hardening of the molded product, the invention is not restricted to any particular procedure. Either pressure or heat may be used alone, if desired, and should this be found convenient and suitable. Or they may be used in combination. Also, pressure may be replaced by, or supplemented with, suction. For best results, there may be used a suitable combination of all three, namely heat, pressure and suction.

Alternatively, the pulp material may be molded by hand-presses and the product be left for air-drying or be dried with heat.

The dried product has been found to exhibit substantial strength and hardness. In the case of the use of fermented water-hyacinth pulp as the, or part of the, plastic molding material, these properties are particularly marked, more so than in the case of the use of non-fermented water-hyacinth pulp. The product molded with the addition of freshly pulped jute-stalk is of better quality than the product molded with the addition of jute-stalk-pulp which has been stored and used without being re-digested.

When it has been dried free from moisture, the molded product may be finished, such as by sandpapering or by any other suitable means in the same way as wooden articles or resinous molded products.

It may also be treated with a varnish or paint or other coating or protective composition to impart a desired color or finish. It has been found that this considerably increases the natural degree of strength and toughness of the product and, also, the latter may be rendered thereby substantially damp-proof and fire-proof. Products made from water-hyacinth pulp alone have been found to be non-inflammable and resistant to damp weather, even without further treatment with varnish or paint.

The water-hyacinth molding material prepared in accordance with the invention, whether alone or in admixture with jute-stalk-pulp or with other pulps as described, may be molded directly to form products having a wide variety of uses. Such products may, for example, be molded to shapes suitable for use for all purposes for which plywood and other forms of timber is or are at present employed. Also for tea chests, furniture, doors, windows, partitions, and the like. They may also be molded for use as heat and electric insulation boards, refrigerating boards, switches, acoustic panelling, wall and ceiling panelling, floor-linings, carriage bodies (such as for motor cars and buses), shelters, molded hats similar to steel helmets, radio cabinets, mill boards and other uses.

The invention is not in any way restricted to the particular embodiments thereof which have been described above by way of example only, and many modifications of the said embodiments may be made within the scope of the appended claims.

I claim:

1. A process for producing molded articles which comprises boiling vegetable material of the species *Eichhornia crassipes* in an aqueous medium until it has been converted into a water-containing, soft pulp containing nitrogenous and inorganic matters of the original material, and molding the pulp, under pressure.

2. A process for producing molded articles which comprises boiling vegetable material of the species *Eichhornia crassipes* in an aqueous medium until it has been converted into a water-containing, soft pulp containing nitrogenous and inorganic matters of the original material, allowing the pulp to ferment until it is converted into a slimy condition in which it retains a large quantity of water, and molding the fermented pulp, under pressure.

3. A process for producing molded articles which comprises boiling vegetable material of the species *Eichhornia crassipes* in an aqueous medium until it has been converted into a water-containing, soft pulp containing nitrogenous and inorganic matters of the original material, letting the pulp ferment for a period of from three to seven days under atmospheric conditions to convert it into a slimy condition in which it retains a large quantity of water, and molding the fermented pulp, under pressure.

4. A process for producing molded articles which comprises boiling vegetable material of the species *Eichhornia crassipes* in an aqueous medium until it has been converted into a water-containing, soft pulp containing nitrogenous and inorganic matters of the original material, and molding the pulp prior to its drying from said boiling, under pressure.

5. A process for producing molded articles which comprises digesting a vegetable material of the species *Eichhornia crassipes* in an aqueous alkaline liquor containing from about 5% to 10% of alkali by weight of water until it has been converted into a water-containing, soft pulp containing nitrogenous and inorganic matters of the original material, and molding the pulp.

6. A process for producing molded articles which comprises digesting a vegetable material of the species *Eichhornia crassipes* in an aqueous alkaline liquor containing from about 5% to 10% of alkali by weight of water until it has been converted into a water-containing, soft pulp containing nitrogenous and inorganic matters of the original material, and molding the pulp while it is still wet from said digestion, under pressure.

7. A process for producing molded articles which comprises digesting a vegetable material of the species *Eichhornia crassipes* in an aqueous alkaline liquor containing the ash of such burned material until it has been converted into a water-containing, soft pulp containing nitrogenous and inorganic matters of the original material, and molding the pulp, under pressure.

8. A process for producing molded articles which comprises boiling vegetable material of the species *Eichhornia crassipes* in an aqueous medium until it has been converted into a water-containing, soft pulp containing nitrogenous and inorganic matters of the original material, mixing the resulting pulp with pulp formed from other vegetable material, and molding the resulting mixture of pulps, under pressure.

9. A process for producing molded articles which comprises boiling vegetable material of the species *Eichhornia crassipes* in an aqueous medium until it has been converted into a water-containing, soft pulp containing nitrogenous and inorganic matters of the original material, mixing the resulting pulp with pulp formed by digesting jute-stalk, and molding the resulting mixture of pulps, under pressure.

10. A process for producing molded articles which comprises boiling vegetable material of the species *Eichhornia crassipes* in an aqueous medium until it has been converted into a water-containing, soft pulp containing nitrogenous and inorganic matters of the original material, and then allowing the pulp to ferment until it is converted into a slimy condition in which it retains a large quantity of water, and molding the pulp while it is still wet from said fermentation, under pressure.

11. A process for producing molded articles which comprises preparing a pulp of vegetable material of the species *Eichhornia crassipes* by boiling such material in an aqueous medium until it has been converted into a water-containing, soft pulp containing nitrogenous and inorganic matters of the original material, preparing a pulp from jute-stalk material by preliminarily breaking up and crushing the jute stalk material, boiling the broken and crushed jute-stalk material in an aqueous medium to reduce it to a soft pulp containing ligno-cellulose, washing the jute-stalk pulp, converting the washed jute-stalk pulp into a moisture-containing paste, mixing the jute-stalk paste with the pulp prepared from the *Eichhornia crassipes*, and molding the resulting mixture, under pressure.

12. The process for producing molded articles which comprises boiling vegetable material of the species *Eichhornia crassipes* in an aqueous medium until it has been converted into a water-containing, soft pulp containing nitrogenous and inorganic matters of the original material, molding the pulp, under pressure, and drying the molded product while it is still under pressure.

13. A process for producing molded articles which comprises preparing a pulp of vegetable material of the species *Eichhornia crassipes* by boiling such material in an aqueous medium until it has been converted into a water-containing, soft pulp containing nitrogenous and inorganic matters of the original material, fermenting said pulp until it is converted into a slimy condition in which it retains a large quantity of water, preparing a pulp from jute-stalk material which retains a substantial quantity of ligno-cellulose of the original material, mixing the jute-stalk pulp with the fermented pulp prepared from the *Eichhornia crassipes* material, and molding the resulting mixture of pulps while still in the wet state, under pressure.

ALI KARIM.